United States Patent Office 3,132,529
Patented May 12, 1964

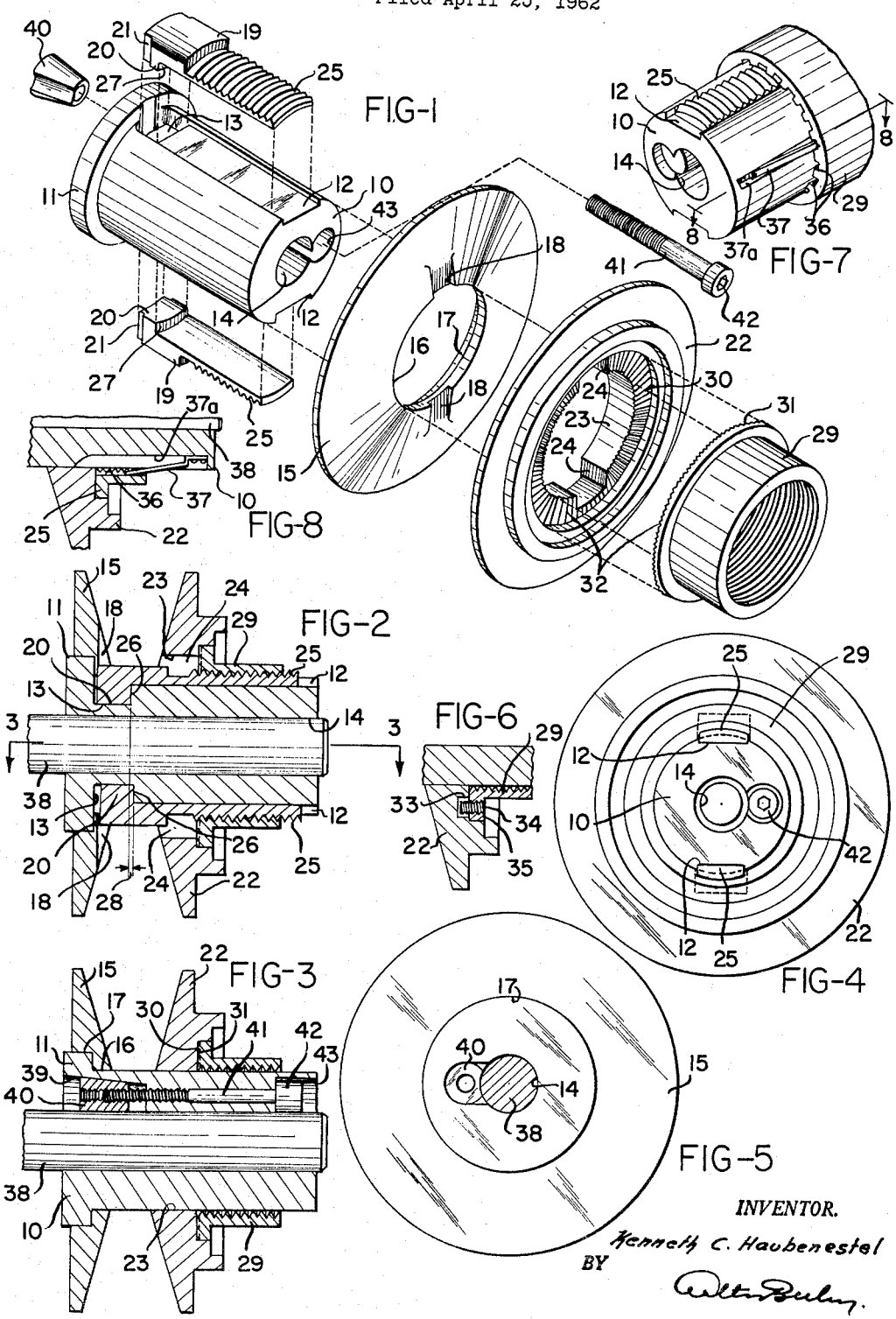

3,132,529
PULLEY, ESPECIALLY FOR V-BELTS
Kenneth C. Haubenestel, 2633 Grant Ave.,
Dayton 6, Ohio
Filed Apr. 25, 1962, Ser. No. 190,112
12 Claims. (Cl. 74—230.17)

This invention relates to V-belt pulleys and is particularly concerned with adjustable V-belt pulleys such as could be mounted on the shaft of drive motors.

Adjustable V-belt pulleys, particularly for drive motors, are notoriously difficult to adjust and are of expensive construction. For example, one common type of pulley has one cone threaded on the hub so this cone must be rotated to adjust the pulley.

The present invention has as an object the overcoming of these difficulties by providing an inexpensive easily adjusted pulley which is as effective in every respect as pulleys according to the prior art.

Another object of the present invention is a pulley which is more inexpensive to construct than previous pulleys on account of the elimination of expensive threaded members and expensive locking means to hold the threaded members together.

Still another object of the present invention, is the provision of a pulley characterized in that it can readily be adjusted without dismantling it from the motor shaft and without removing the belt therefrom while, at the same time, once the pulley is adjusted it, remains locked in its adjusted position.

A still further object of the present invention is an adjustable pulley which is capable of extremely fine adjustment so that any desired setting of the pulley can be achieved.

The several objects of the present invention referred to above as well as other objects and advantages thereof will become more apparent upon reference to the following specification taken in connection with the accompanying drawings in which.

FIGURE 1 is a perspective view showing the several parts of my pulley in disassembled relation.

FIGURE 2 is a sectional view through the pulley assembled.

FIGURE 3 is a sectional view indicated by line 3—3 on FIGURE 2.

FIGURE 4 is a view looking in from the right side of the pulley as it is viewed in FIGURE 2.

FIGURE 5 is a view looking in from the left side of the pulley as it is seen in FIGURE 2.

FIGURE 6 is a fragmentary view showing one manner in which the adjusting nut of the pulley construction could be locked against accidental rotation.

FIGURE 7 is a fragmentary view showing another manner of locking the adjustment nut against rotation.

FIGURE 8 is a sectional view taken on line 8—8 of FIGURE 7.

Referring to the drawings more in detail, the pulley comprises a single tubular hub member 10 having a head 11 at one end. Diametrically opposite longitudinal grooves 12 are formed in the member and these extend from the one end of the member up to the head end thereof and each terminates in a recess portion 13.

Member 10 is tubular and comprises a center hole 14 for receiving a supporting shaft.

Pertaining to member 10 is a first cone disc 15 having a central aperture 16 into which member 10 extends with one side of the disc having a recess 17 for receiving head 11.

The inner inclined face of cone disc 15 has radial notches 18 that will register with grooves 12 when the cone disc is placed on member 10.

There are provided two identical bars or key-like elements 19 adapted for being received in grooves 12 and having offset portions 20 at their one ends for being received in recesses 13. The said elements 19 have end parts 21 adapted for engaging radial notches 18 in cone disc 15 when the disc is placed on member 10 in engagement with head 11, and the bar or key-like elements 19 then placed in grooves 12. Cone disc 15 is in this manner keyed to member 10 so as to be drivingly interconnected therewith.

A second cone disc 22 is provided which has a central aperture 23 for receiving member 10 and which is provided with axial notches 24 for receiving the elements 19. Cone disc 22 is in this manner slidably received on member 10 but is keyed thereto by enagement of the axial notches with the elements 19.

The elements 19, along the major portion of their length, protrude somewhat radially outwardly from grooves 12 and have screw threads 25 formed therein. The elements 19 are made identical and in order to position the elements axially relative to each other so that the thread on each is a continuation of the thread on the other. The recesses 13 have radial surfaces 26 which engage radial surfaces 27 on the offset portions 20 of the elements 19 thereby to position the elements 19 in the aforesaid manners. These radial surfaces 26 are offset the proper distance relatively axially as indicated by the dimension 28 in FIGURE 2.

The assembly of the pulley proper is completed by the nut 29 that mounts on the member 10 by threadingly engaging threads 25 of the protruding portions of the elements 19. In normal operation, a belt will be disposed between cone discs 15 and 22 and wedge them apart and this action is availed of for locking nut 29 against accidental rotation.

This is done by providing the radial surface 30 of the cone disc 22 and radial surface 31 of the nut with interengaging radial serrations 32. It will be evident that the nut 29 can be rotated only if the pressure between cone disc 22 and nut 29 is first relieved.

It is also possible to lock nut 29 to cone disc 22, as shown in FIGURE 6, by providing the cone disc with circumferentially spaced recesses 33 adapted for receiving a screw 34 threaded through radial flange 35 of the nut. The nut can be adjusted according to this modification by backing screw 34 outwardly until the nut is free to turn.

FIGURE 7 shows an arrangement wherein nut 29 is provided with axial notches 36 about the inside, while member 10 carries a spring element 37 in a groove 37a adapted for engaging notches 36 thereby to lock the nut in rotated positions on the member. The nut can be released by pressing inwardly on spring element 37 whereupon the nut becomes free to rotate in either direction. The spring element, when pressed inwardly, is disposed entirely within its groove 37a so the nut can be rotated freely.

For clamping member 10 to the shaft 38 that extends into the center hole or central bore 14 of the member 10, I provide a tapered hole 39 in one end of the member 10 intersecting the center hole. In this tapered hole is tapered plug 40 and threadedly engaging the tapered plug is a screw 41 that extends axially through the member 10 and which has its head 42 disposed in a cylindrical recess 43. By rotating screw 41 by a suitable tool plug 40 can be pulled inwardly in tapered hole 39 and thereby wedged tightly against shaft 38 to drivingly connect hub member 10 to the shaft. Loosening of the hub member from the shaft is carried out by backing off screw 41 and then tapping it so as to drive tapered member 40 outwardly in tapered hole 39, thereby to free it from shaft 38.

The described arrangement is relatively simple to construct and is inexpensive and easy to assemble and adjust.

No expensive threading operations are required on the cone discs or on the hub member which has been common practice with prior art pulleys of this nature.

The mounting and dismounting of the entire pulley with respect to the motor shaft is easily accomplished and without requiring the forming of a keyway within the motor shaft.

It will be understood that this invention is susceptible to modification in order to adapt it to different usages and conditions and, accordingly, it is desired to comprehend such modifications within this invention as may fall within the scope of the appended claims.

I claim:

1. In a pulley; a member adapted for mounting on a shaft, cone discs on the member and at least one thereof being axially movable on the shaft, longitudinal groove means in the member, key-like element means in the groove means projecting radially therefrom, means holding said key-like element means against axial movement in said groove means, threads on the outer face of said element means, notch means in at least the said one cone disc to receive the key-like element means, and a nut surrounding the member and threadedly engaging the threads on said element means to form an adjustable abutment to hold said one cone disc in adjusted position on said member.

2. In a pulley; a generally cylindrical member with a head on one end, said member being adapted for driving connection with a shaft for rotation of the member on its axis, longitudinal groove means in the member extending from the head end thereof to the opposite end, key-like element means in said groove means projecting radially therefrom and threaded on the projecting portion, means holding said key-like element means against axial movement in said groove means, a first cone disc on the member engaging said head and notched to receive the element means at the end thereof adjacent said head, a second cone disc notched so as to be slidable on the member along said element means, and a nut surrounding said member and threadedly engaging the threads of said element means so as to form an adjustable abutment for holding said second cone disc in adjusted position on said member.

3. In a pulley; a generally cylindrical member with a head at one end, circumferentially spaced longitudinal grooves in said member extending from the head end to the opposite end thereof, a first cone disc on said member recessed to receive said head and having radial notches on the side opposite the head, bar-like elements in said grooves having end parts fitting in said radial notches, said elements protruding radially from said member and having their protruding portions threaded, means holding said elements in said grooves against axial movement therein, a second cone disc on said member having axial notches to receive the protruding portions of said elements and slidable along said member, a nut surrounding said member and threaded to the threaded portions of said elements to form an adjustable abutment for said second cone disc, and means for holding said nut against undesired rotation relative to said second cone disc.

4. In a pulley; a generally cylindrical member with a head at one end, circumferentially spaced longitudinal grooves in said member extending from the head end to the opposite end thereof, a first cone disc on said member recessed to receive said head and having radial notches on the side opposite the head, bar-like elements in said grooves and held against axial movement therein and having end parts fitting in said radial notches, said elements protruding radially from said member and having their protruding portions threaded, a second cone disc on said member having axial notches to receive the protruding portions of said elements and slidable along said member, a nut surrounding said member and threaded to the threaded portions of said elements to form an adjustable abutment for said second cone disc, said second cone disc and nut having mating radial surfaces, and said surfaces being serrated radially for locking interengagement so as to lock the nut against rotation relative to said member when the second cone disc is pressed against the nut.

5. In a pulley; a generally cylindrical member with a head at one end, circumferentially spaced longitudinal grooves in said member extending from the head end to the opposite end thereof, a first cone disc on said member recessed to receive said head and having radial notches on the side opposite the head, bar-like elements in said grooves and held against axial movement therein and having end parts fitting in said radial notches, said elements protruding radially from said member and having their protruding portions threaded, a second cone disc on said member having axial notches to receive the protruding portions of said elements and slidable along said member, a nut surrounding said member and threaded to the threaded portions of said elements to form an adjustable abutment for said second cone disc, said second cone disc having circumferentially spaced recesses on the nut side thereof, and a lock screw threaded into the nut adapted for entering said recesses to lock the nut to the second cone disc.

6. In a pulley; a generally cylindrical member with a head at one end, circumferentially spaced longitudinal grooves in said member extending from the head end to the opposite end thereof, a first cone disc on said member recessed to receive said head and having radial notches on the side opposite the head, bar-like elements in said grooves and held against axial movement therein and having end parts fitting in said radial notches, said elements protruding radially from said member and having their protruding portions threaded, a second cone disc on said member having axial notches to receive the protruding portions of said elements and slidable along said member, a nut surrounding said member and threaded to the threaded portions of said elements to form an adjustable abutment for said second cone disc, said nut having circumferentially spaced axial notches about the inside, and a spring leaf carried by said member adapted for engaging said notches in the nut to hold the nut in rotated positions on the member.

7. In a pulley; a generally cylindrical member with a head at one end, circumferentially spaced longitudinal grooves in said member extending from the head end to the opposite end thereof, a first cone disc on said member recessed to receive said head and having radial notches on the side opposite the head, said grooves having inwardly extending recesses at the ends adjacent the head, bar-like elements in said grooves having offset portions disposed in said recesses and having end parts disposed in said radial notches, said elements having portions protruding radially from said member and threaded, a second cone disc on said member axially notched to receive said elements so as to be slidable along the member to vary the pitch of the pulley and so as to be keyed to said member, a nut on the member threadedly engaging the threaded portions of said elements and forming an adjustable abutment for said second cone disc, and means for locking the nut against rotation on the member.

8. In a pulley; a generally cylindrical member with a head at one end, circumferentially spaced longitudinal grooves in said member extending from the head end to the opposite end thereof, a first cone disc on said member recessed to receive said head and having radial notches on the side opposite the head, said grooves having inwardly extending recesses at the ends adjacent the head, bar-like elements in said grooves having offset portions disposed in said recesses and having end parts disposed in said radial notches, said elements having portions protruding radially from said member and threaded, a second cone disc on said member axially notched to receive said elements so as to be slidable along the member to vary the pitch of the pulley and so as to be keyed to said member, a nut on the member threadedly engaging the threaded portions of said elements and forming an adjustable abutment for said second cone disc, and means for locking the nut against rotation on the member, said bar-like elements being identical, and said recesses being so formed as to support the elements in such positions relative to each other that the thread on one element is a continuation of the thread on the other element.

9. In a pulley; a generally cylindrical member with a head at one end, circumferentially spaced longitudinal grooves in said member extending from the head end to the opposite end thereof, a first cone disc on said member recessed to receive said head and having radial notches on the side opposite the head, said grooves having inwardly extending recesses at the ends adjacent to the head, bar-like elements in said grooves having offset portions disposed in said recesses and having end parts disposed in said radial notches, said elements having portions protruding radially from said member and threaded, a second cone disc on said member axially notched to receive said elements so as to be slidable along the member to vary the pitch of the pulley and so as to be keyed to said member, a nut on the member threadedly engaging the threaded portions of said elements and forming an adjustable abutment for said second cone disc, and means for locking the nut against rotation on the member, said bar-like elements being identical, and said recesses having radial surfaces engaging said offset portions of said elements and which surfaces are axially offset from each other so as to position said elements in relative positions such that the thread on each is a continuation of the thread on the other.

10. In a pulley; a tubular member having relatively adjustable cone discs thereon, said tubular member having a central hole for receiving a shaft therein, an axial tapered hole in one end of said member intersecting said central hole, a tapered plug in said tapered hole and screw threaded means connecting the tapered plug to the member adjustable for driving the tapered plug into the tapered hole and against a shaft in the central hole of the member.

11. In a pulley; a tubular member having relatively adjustable cone discs thereon, said tubular member having a central hole for receiving a shaft therein, a tapered hole in one end of the member intersecting the central hole of the member and tapering inwardly of the member, a tapered plug in the said tapered hole, and a screw extending through said member from the end opposite said tapered hole and threaded into said tapered plug whereby the plug can be drawn down into the tapered hole by the screw and grip a shaft in said central hole of the member.

12. In a pulley arrangement: a hub member mountable on a shaft, cone discs arranged on said hub member, at least one of said cone discs being axially movable on said hub member, said member being provided with longitudinal groove means, a key member arranged in and radially projecting from said groove means into said cone discs and held in said groove means against axial movement therein, said key member being provided with a thread, and a nut threadedly engaging said thread and being adjustable along said thread in both directions to abut said one cone disc in adjusted position along said hub member.

References Cited in the file of this patent
UNITED STATES PATENTS

| | | |
|---|---|---|
| 943,209 | White | Dec. 14, 1909 |
| 2,254,045 | Nylin | Aug. 26, 1941 |
| 2,401,536 | Williams | June 4, 1946 |
| 2,550,511 | Williams | Apr. 24, 1951 |
| 2,890,592 | Keepers | June 16, 1959 |